US005617834A

United States Patent [19]
Lohr

[11] Patent Number: 5,617,834
[45] Date of Patent: Apr. 8, 1997

[54] AIR-OIL SEPARATOR FOR A CRANKCASE VENTILATION SYSTEM IN AN INTERNAL COMBUSTION ENGINE

[75] Inventor: John C. Lohr, Beverly Hills, Mich.

[73] Assignee: Ford Motor Company, Dearborn, Mich.

[21] Appl. No.: 611,047

[22] Filed: Mar. 5, 1996

[51] Int. Cl.$^6$ .................................................. F02M 25/00
[52] U.S. Cl. ........................................................... 123/572
[58] Field of Search .................................. 123/572, 573, 123/574, 41.86

[56] References Cited

U.S. PATENT DOCUMENTS

| | | |
|---|---|---|
| 1,039,677 | 9/1912 | Theisen . |
| 1,447,160 | 2/1923 | Thompson . |
| 2,209,607 | 7/1940 | Nutting . |
| 2,228,129 | 1/1941 | Stephano . |
| 2,344,068 | 3/1944 | Waseige . |
| 2,779,434 | 1/1957 | Smith . |
| 3,234,716 | 2/1966 | Sevin et al. . |
| 3,293,832 | 12/1966 | Loftheim . |
| 3,406,504 | 10/1968 | Sylvan . |
| 3,686,831 | 8/1972 | Libby . |
| 3,720,045 | 3/1973 | Murphy . |
| 3,976,448 | 8/1976 | Eng et al. ............................ 123/572 |
| 4,963,329 | 10/1990 | Burgess et al. . |
| 5,069,192 | 12/1991 | Matsumoto et al. ................. 123/572 |
| 5,080,082 | 1/1992 | Mueller et al. ...................... 123/572 |
| 5,129,371 | 7/1992 | Rosalik, Jr. . |
| 5,239,972 | 8/1993 | Takeyama et al. .................. 123/573 |
| 5,261,380 | 11/1993 | Romano . |
| 5,450,835 | 9/1995 | Wagner . |
| 5,460,147 | 10/1995 | Bohl ..................................... 123/572 |
| 5,487,371 | 1/1996 | Beckman et al. . |

OTHER PUBLICATIONS

Cosworth MBA Engine, C.J. Poole, R. J. Hancock, D.C. Cairns, Cosworth Engineering.

*Primary Examiner*—Marguerite McMahon
*Attorney, Agent, or Firm*—Neil P. Ferraro

[57] ABSTRACT

A clear base ventilation system for an internal combustion engine includes an air-oil separator. Blowby gas from the engine crankcase is drawn into the inlet of the separator in a swirling cyclonic motion so as to force any oil entrained in the blowby gas to impinge on the walls of the inlet and drain back into the crankcase. Blowby gas is then drawn into a baffle which further removes any entrained oil in the blowby gas as the gas flows therethrough. An outlet chamber exists at the end of the baffle and has a volume of space substantially greater than the volume of space in the baffle such that blowby gas flowing out of the baffle reduces in speed, thereby allowing any further entrained oil to separate from the blowby gas. Substantially oil-free gas is then introduced to the air induction system of the engine.

17 Claims, 2 Drawing Sheets

5,617,834

AIR-OIL SEPARATOR FOR A CRANKCASE VENTILATION SYSTEM IN AN INTERNAL COMBUSTION ENGINE

FIELD OF THE INVENTION

The present invention relates to a crankcase ventilation system for an internal combustion engine, and more particularly to an air-oil separator for removing entrained oil from crankcase blowby gases.

BACKGROUND OF THE INVENTION

When the air-fuel mixture in the combustion chamber of an internal combustion engine is ignited, a portion of the burnt gas during the power stroke leaks between the piston and the cylinder wall into the crankcase. The need to remove this gas, commonly referred to as blowby gas, from the engine crankcase is well known. Otherwise, the blowby gas would deteriorate the quality of the lubricating oil in the crankcase and also tend to increase crankcase pressure, thereby inducing oil leakage from the crankcase. Generally, the blowby gas is vented out of the crankcase and returned to the combustion chamber through the crankcase ventilation system. However, any excess oil entrained in the blowby gas must be removed prior to introducing the blowby gas to the combustion chamber.

Typically, air-oil separators are used to remove the entrained oil. The inventors of the present invention have recognized certain drawbacks with prior art separators, however. Some prior art separators utilize a blower to impart fluid motion on the blowby gas so that the blowby gas can pass through the air-oil separator. Other prior art separators rely solely on the lubricating oil in the blowby gas impinging on the walls of a baffle. However, in these separators, an inadequate amount of entrained oil is removed.

SUMMARY OF THE INVENTION

An object of the present invention is to provide an air-oil separator for a crankcase ventilation system in an internal combustion engine wherein blowby gas is drawn through the air-oil separator under engine vacuum such that a substantial amount of entrained oil is removed from the blowby gas.

The above object is achieved, and problems of prior art approaches overcome, by providing a novel air-oil separator in a crankcase ventilation system of an internal combustion engine. The engine includes a crankshaft, a crankcase housing the crankshaft, and an air induction system. The ventilation system includes the air-oil separator for separating entrained lubricating oil from blowby gases contained within the crankcase, for returning the separated oil to the crankcase and for introducing the oil separated gas to the air induction system. The air-oil separator includes a housing, and an inlet at an upper end of the housing and being in fluid communication with the crankcase for receiving a stream of blowby gas. The inlet includes an outer cylindrical tube defining an axis and an inner cylindrical tube that is substantially coaxial with the outer tube. The inner tube has a length less than the length of the outer tube when measured along the axis. The outer tube has a bottom edge lying in the plane and the inner tube has a bottom edge lying in a plane that intersects the bottom edge plane of the outer tube. When the air-oil separator is placed in the crankcase ventilation system, blowby gas is drawn into the inlet such that it swirls in a cyclone thereby forcing at least a portion of the entrained oil to move outward and impinge on the outer tube and drain into the crankcase of the engine.

The air-oil separator also includes a partially enclosed baffle within the housing such that blowby gas leaving the inlet enters the baffle at a baffle inlet. Thus, at least a portion of any remaining oil entrained in the blowby gas impinges on interior walls of the baffle and drains to the inlet. The blowby gas then exits the baffle at a baffle outlet. An outlet chamber within the housing and in fluid communication with the baffle outlet has a volume of space that is substantially greater than the volume of space in the baffle. This causes the speed of the blowby gas entering the outlet chamber to decrease, thereby allowing any further entrained oil in the blowby gas to fall out of the stream and drain into the baffle. The air-oil separator further includes an outlet at the upper end of the housing to introduce the oil-separated gas to the air induction system of the internal combustion engine.

An advantage of the above aspect of the invention is that lubricating oil entrained in blowby gas may be efficiently and sufficiently removed.

Another advantage of the above aspect of the invention is that blowby gas enters the air-oil separator by means of engine vacuum thereby obviating the need for any external means of imparting motion on the blowby gas.

Yet another advantage of the present invention is that a substantial amount of entrained lubricating oil is removed from the blowby gas using a low cost, easily manufactureable air-oil separator.

Other objects, features and advantages of the present invention will readily appreciated by the reader of this specification.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 1:
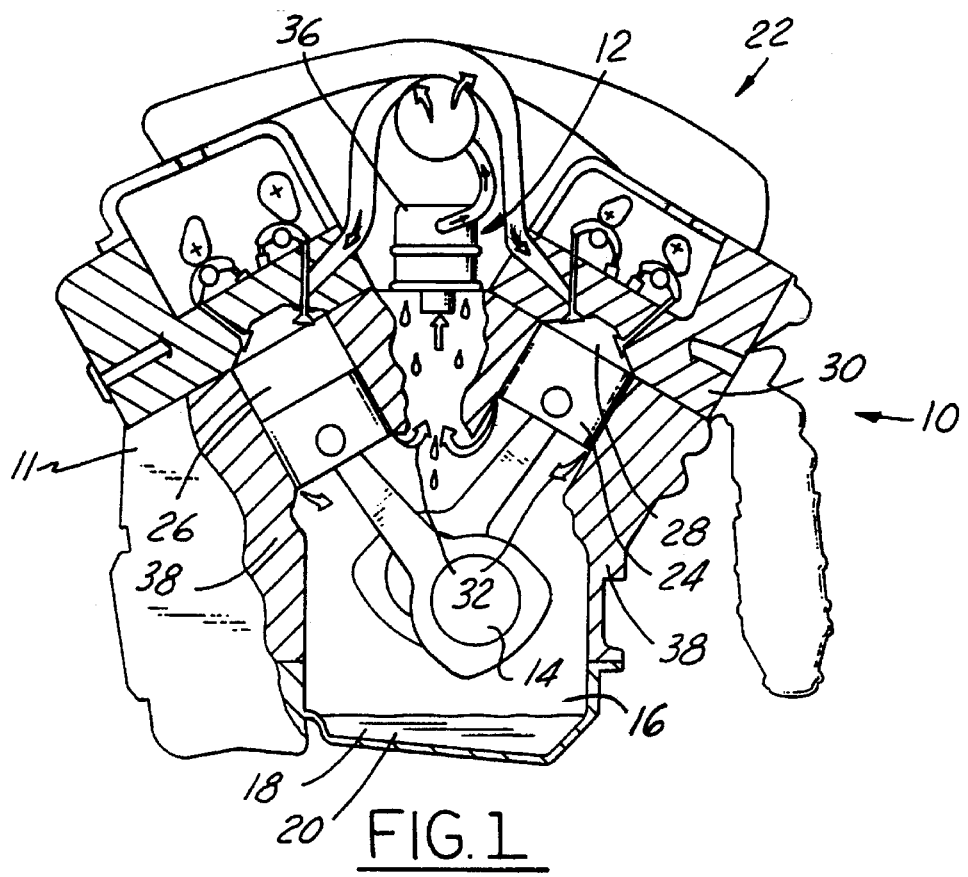
FIG. 1 is a diagrammatic cross-sectional view of the crankcase ventilation system for the internal combustion engine according to the present invention.

Internal combustion engine 10, shown in FIG. 1, includes cylinder block 11, crankcase ventilation system 12, crankshaft 14, crankcase 16, including sump 18 having lubricating oil 20, and air induction system 22. Engine 10 further includes a plurality of pistons 24 reciprocally housed within cylinders 26 of cylinder block 11. Combustion chamber 28 is defined by the top of piston 24 and cylinder head 30. During combustion of the air-fuel mixture in combustion chamber 28, blowby gases, shown as arrows 32, leak past the pistons and enter crankcase 16. Blowby gases 32, are generally routed back to air induction system 22 for use with additional air-fuel mixture. However, any entrained lubricating oil must first be removed.

To remove the entrained oil, air-oil separator 36 is mounted as close to crankcase 16 as possible. In this example, engine 10 is a V-type multi-cylinder engine with air-oil separator 36 mounted on cylinder block 11 between the two cylinder banks 38.

Figure 2:
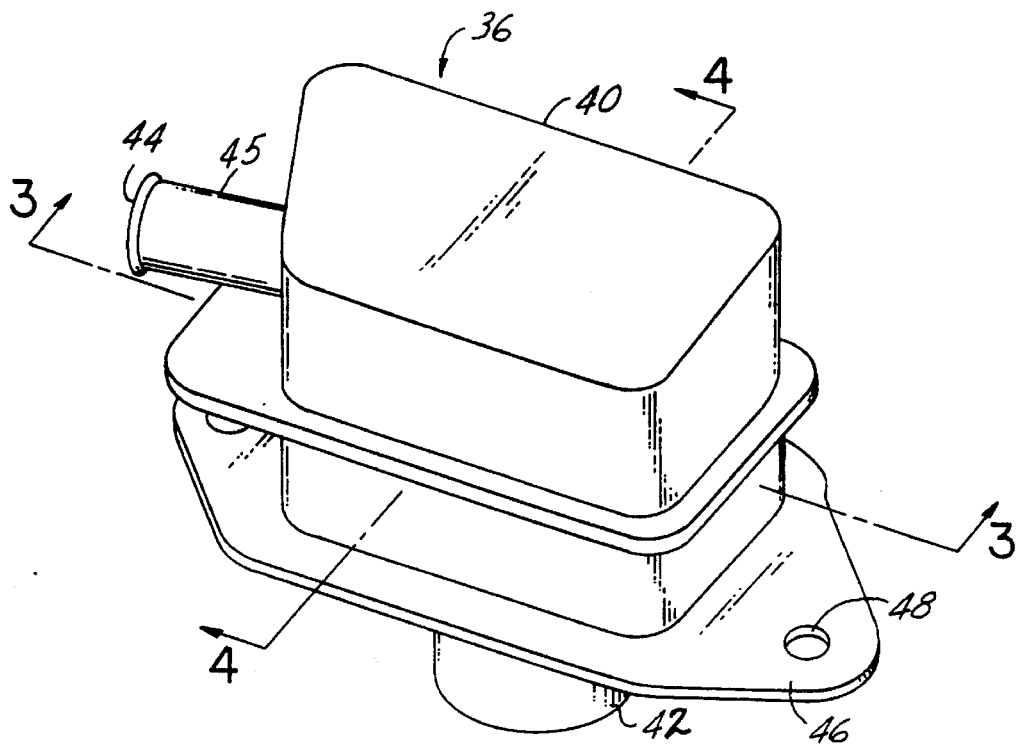
FIG. 2 is a diagrammatic perspective view of an air-oil separator used in the crankcase ventilation system according to the present invention.

FIG. 2 illustrates air-oil separator 36, which includes housing 40, inlet 42 and outlet 44. According to the present invention, blowby gas 32 is drawn through separator 36 where entrained lubricating oil is separated from blowby gases 32. The separated oil is returned to crankcase 16 and the oil-free gas enters air induction system 22 via outlet 44. As would be apparent to one of ordinary skill in view of this disclosure, outlet 44 is shown to include an outlet tube 45 for providing a connection point to air induction system 22 of engine 10. Mounting flange 46, with holes 48, is used to mount separator 36 to engine 10.

Figure 4:
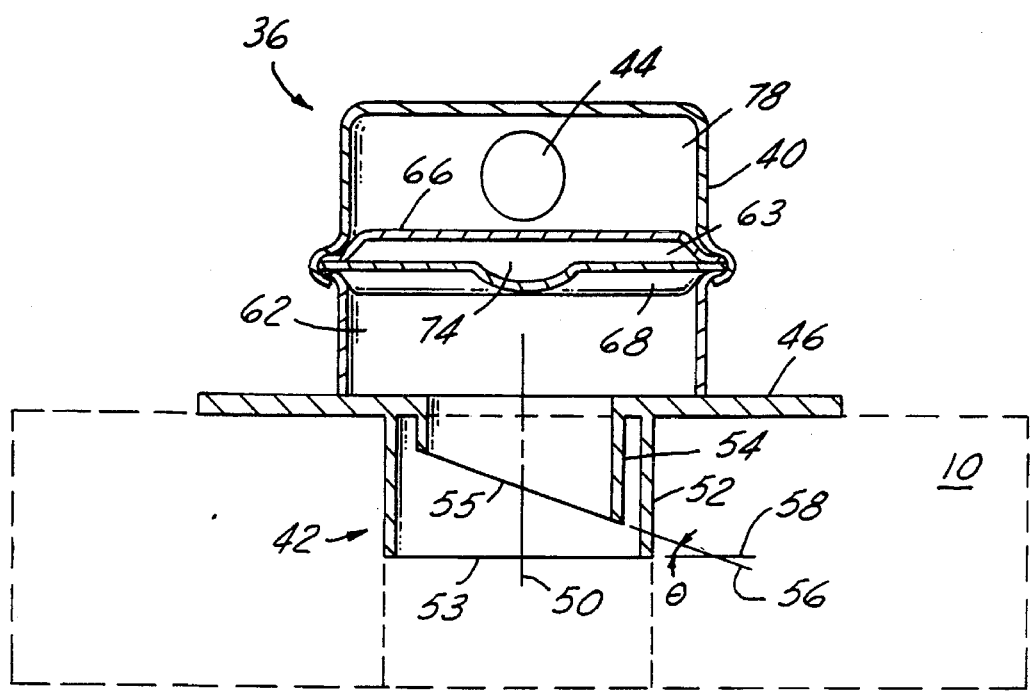
FIG. 4 is a cross-sectional view of the air-oil separator taken along line 4—4 of FIG. 2.
Figure 3:
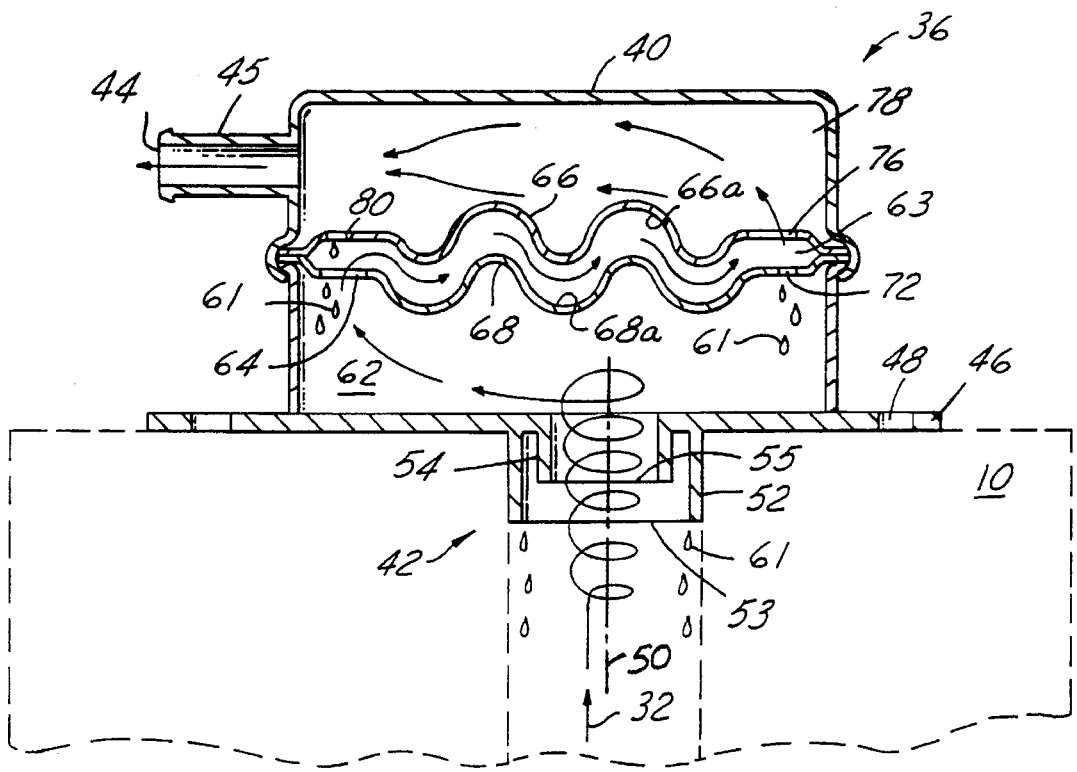
FIG. 3 is a cross-sectional view of the air-oil separator taken along line 3—3 of FIG. 2.

The structure and operation of separator 36 will now be described with particular reference to FIGS. 3 and 4, which represent cross-sectional views of separator 36. Inlet 42 includes outer cylindrical tube 52, defining axis 50, having bottom edge 53, and inner cylindrical tube 54, having bottom edge 55. Inner tube 54 is substantially coaxial with outer tube 52. Inner tube 54 has a length, as measured along axis 50, less then the length of outer tube 52. Bottom edge 55 of inner tube 54 lies in plane 56 such that it intersects plane 58 of bottom edge 53 of outer tube 52. The included angle, θ, of the intersecting planes 56, 58 is preferably about 45°. According to the present invention, engine vacuum draws blowby gas 32 into inlet 42 such that blowby gas 32 swirls in a cyclone as shown by arrow 60 (FIG. 3). Thus, at least a portion of the entrained oil is forced outward and impinges on outer tube 52. The oil then drains into crankcase 16, shown by oil droplets 61, and into sump 18. To further facilitate draining of oil droplets 61, inlet axis 50 is substantially perpendicular to the axis of crankshaft 14 when separator 36 is mounted to engine 10.

Blowby gas 32 is then drawn through chamber 62 and into baffle 63 at baffle inlet 64. As blowby gas 32 proceeds through baffle 63 any further entrained oil impinges on the interior surfaces 66a and 68a of top wall 66 and bottom wall 68, respectively. Any entrained oil collected by interior walls 66a and 68a drains through baffle inlet 64, into chamber 62, through inlet 42 and into crankcase 16. To further enhance draining of oil from baffle 63, port 72 is formed through bottom wall 68. In addition, as best shown in FIG. 4, open channel 74 is formed in bottom wall 68 and extends from baffle inlet 64 to baffle outlet 76 to aid in draining oil from baffle 63.

In this example, baffle 63 extends along the length of housing 40 substantially perpendicular to inlet axis 50. However, those skilled in the art will appreciate in view of this disclosure that, to further facilitate oil draining, baffle 63 may be positioned in housing 40 at an angle other than 90° to inlet axis 50. To aid in manufacturing separator 36, as well as to reduce its complexity, top wall 66 of baffle 63 is substantially identical to bottom wall 68. Baffle 63 is thus assembled with top wall 66 facing one direction and bottom wall 68 facing in the opposite direction.

Blowby gas 32 exits baffle 63 through baffle outlet 76 and is drawn into outlet chamber 78. The volume of space in outlet chamber 78 is substantially greater than the volume of space in baffle 63 such that when blowby gas 32 enters outlet chamber 78, the speed of blowby gas 32 substantially reduces. This allows any further entrained oil in blowby gas 32 to fall out of the blowby gas stream. As previously stated, because it is desirable to form baffle 63 with substantially identical top and bottom walls 66, 68, top wall 66 is formed with port 80 to allow oil in outlet chamber 78 to drain therefrom. Blowby gas 32 is then drawn out of separator 36 via outlet 44. Therefore, according to the present invention, inlet 42, baffle 63 and outlet chamber 78 are arranged in series relationship to introduce substantially oil-free gas to air induction system 22 of engine 10.

While the best mode in carrying out the invention has been described in detail, those having ordinary skill in the art in which this invention relates will recognize various alternative designs and embodiments, including those mentioned above, in practicing the invention that has been defined by the following claims.

I claim:

1. A crankcase ventilation system for an internal combustion engine, the engine having a cylinder block, a crankshaft, a crankcase housing the crankshaft, and an air induction system, the ventilation system comprising:

an air-oil separator for separating entrained lubricating oil from blowby gases contained within said crankcase, for returning separated oil to said crankcase and for introducing the oil-free gas to the air induction system, with said oil separator comprising:

a housing;

an inlet at a lower end of said housing and being in fluid communication with said crankcase, with said inlet receiving a stream of blowby gas, and with said inlet having an outer cylindrical tube defining an axis and an inner cylindrical tube substantially coaxial with said outer tube, said inner tube having a length less than the length of the outer tube when measured along said axis, said inner tube and said outer tube having bottom edges lying in intersecting planes, with said blowby gas in said inlet swirling in a cyclone, thereby forcing at least a portion of entrained oil to move outward and impinge on said outer tube and drain into the crankcase;

a partially enclosed baffle within said housing, said blowby gas entering said baffle at a baffle inlet at one end thereof such that at least a portion of oil entrained in said blowby gas impinges on interior walls of said baffle and drains to said inlet, with said blowby gas exiting said baffle at a baffle outlet at another end thereof;

an outlet chamber within said housing and being in fluid communication with said baffle outlet, said outlet chamber having a volume of space substantially greater than the volume of space in said baffle such that blowby gas entering said outlet chamber decreases in velocity, thereby allowing any further entrained oil in said blowby gas to fall out of said stream and drain into said baffle; and, an outlet at an upper end of said housing and being in fluid communication with said outlet chamber for introducing the oil-free gas to the air induction system.

2. A system according to claim 1 wherein said engine is a V-type multi-cylinder engine, with said oil separator being mounted on the cylinder block between the two banks of cylinders.

3. A system according to claim 1 wherein a chamber is located between said inlet and said baffle inlet, with said chamber collecting any oil draining from said baffle and said outlet chamber.

4. A system according to claim 1 wherein said baffle extends within said housing substantially parallel to the axis of said crankshaft, thereby defining top and bottom walls.

5. A system according to claim 4 wherein an open channel is formed in said bottom wall of said baffle, with said open channel extending from said baffle inlet to said baffle outlet, thereby aiding the draining of oil from said baffle.

6. A system according to claim 4 wherein at least one port is formed through said bottom wall of said baffle, thereby aiding the draining of oil from said baffle.

7. A system according to claim 4 wherein at least one port is formed through said top wall of said baffle, thereby aiding the draining of oil from said outlet chamber.

8. A system according to claim 1 wherein said inlet axis is substantially perpendicular to the axis of said crankcase.

9. An air-oil separator for an automotive engine having a crankshaft, a crankcase housing the crankshaft, and an air induction system, comprising:

a housing;

an inlet at a lower end of said housing and being in fluid communication with the crankcase, with said inlet receiving a stream of blowby gas contained within said crankcase, and with said inlet having an outer cylindrical tube defining an axis and an inner cylindrical tube substantially coaxial with said outer tube, said inner tube having a length less than the length of the outer tube when measured along said axis, said outer tube having an outer edge lying in a plane substantially perpendicular to said inlet axis, said inner tube having an outer edge lying in a plane intersecting said outer edge plane of said outer tube, such that, when in use, said blowby gas in said inlet swirling in a cyclone thereby forcing at least a portion of entrained oil to move outward and impinge on said outer tube and drain into the crankcase;

a partially enclosed baffle within said housing, said baffle having a baffle inlet at one end thereof and a baffle outlet at another end thereof such that, when in use, at least a portion of oil entrained in said blowby gas impinges on interior walls of said baffle and drains to said inlet;

an outlet chamber within said housing and being in fluid communication with said baffle outlet, said outlet chamber having a volume of space substantially greater than the volume of space in said baffle such that, when in use, blowby gas entering said outlet chamber decreases in velocity, thereby allowing any further entrained oil in said blowby gas to fall out of said stream and drain into said baffle; and, an outlet at an upper end of said housing and being in fluid communication with said outlet chamber for introducing the oil-free gas to the air induction system.

10. An air-oil separator according to claim 9 wherein a chamber is located between said inlet and said baffle inlet, with said chamber collecting any oil draining from said baffle and said outlet chamber.

11. An air-oil separator according to claim 10 wherein said baffle extends within said housing substantially perpendicular to said inlet axis, thereby defining top and bottom walls.

12. An air-oil separator according to claim 11 wherein an open channel is formed in said bottom wall of said baffle, with said open channel extending from said baffle inlet to said baffle outlet.

13. An air-oil separator according to claim 11 wherein at least one port is formed through said bottom wall of said baffle, thereby aiding the draining of oil from said baffle.

14. An air-oil separator according to claim 11 wherein at least one port is formed through said top wall of said baffle, thereby aiding the draining of oil from said outlet chamber.

15. An air-oil separator according to claim 9 further comprising a mounting flange attached to said housing for mounting said separator to the engine.

16. An air-oil separator according to claim 9 further comprising an outlet tube joined to said outlet for providing a connection point to the air induction system of the engine.

17. An air-oil separator for an automotive engine having a crankshaft, a crankcase housing the crankshaft, and an air induction system, comprising:

a housing;

a cyclonic section at a lower end of said housing and being in fluid communication with the crankcase, with said cyclonic section receiving a stream of blowby gas contained within said crankcase such that, when in use, said blowby gas in said cyclonic section swirls in a cyclone thereby forcing at least a portion of entrained oil to move outward and drain into the crankcase;

an impinging section within said housing and being arranged in series relationship relative to said cyclonic section, said impinging section having an inlet at one end thereof and an outlet at another end thereof such that, when in use, at least a portion of oil entrained in said blowby gas coalesces on said impinging section and drains to said cyclonic section;

a venturi section within said housing and being in fluid communication with and arranged in series relationship relative to said impinging section, with said venturi section having a volume of space substantially greater than a volume of space in said impinging section such that, when in use, blowby gas entering said venturi section decreases in velocity, thereby allowing any further entrained oil in said blowby gas to fall out of said stream and drain into said impinging section; and, an outlet at an upper end of said housing and being in fluid communication with said venturi section for introducing the oil-free gas to the air induction system.

* * * * *